US005751826A

United States Patent [19]

Theus

[11] Patent Number: 5,751,826

[45] Date of Patent: May 12, 1998

[54] MONOLITHICALLY INTEGRABLE MIXER NETWORK FOR A MIXER CONSOLE

[75] Inventor: Ulrich Theus, Gundelfingen, Germany

[73] Assignee: Deutsche ITT Industries GmbH, Freiburg, Germany

[21] Appl. No.: 654,372

[22] Filed: May 28, 1996

[30] Foreign Application Priority Data

Jun. 1, 1995 [EP] European Pat. Off. .............. 95108370

[51] Int. Cl.$^6$ .............. H04B 1/00

[52] U.S. Cl. .............. 381/119; 381/120; 381/104

[58] Field of Search .............. 381/119, 104, 381/109, 102, 80, 81, 82, 85, 77, 120

[56] References Cited

U.S. PATENT DOCUMENTS 4,357,492 11/1982 Campbell et al. .
4,885,792 12/1989 Christensen et al. .
5,309,517 5/1994 Barclay .
5,376,896 12/1994 Graefe et al. .
5,406,636 4/1995 Yamada et al. .............. 381/104

OTHER PUBLICATIONS

Shaw, "MINIMIX 6", Practical Electronics, vol. 11, No. 11, Nov. 1975, pp. 904–907.

*Primary Examiner*—Curtis Kuntz
*Assistant Examiner*—Ping W. Lee
*Attorney, Agent, or Firm*—Plevy & Associates

[57] ABSTRACT

A monolithic integrable mixer network for a mixer console includes a variable gain preamplifier for each sound channel, a summing amplifier whose summing gain is adjustable differently for each sound channel, and a control unit which divides the channel gain for the respective sound channel between the preamplifier and the summing amplifier according to a ratio dependent on the desired channel gain to optimize the noise performance of the mixer network.

20 Claims, 3 Drawing Sheets

| vk = vm · vs dB | vm dB | vs dB | Rsv' + R3 kΩ | a1 Position | a2 Position |
|---|---|---|---|---|---|
| +12 | +12 | 0 | 3 | k1 | k2 |
| 0 | 0 | 0 | 3 | | |
| -6 | -6 | 0 | 3 | a1max | k2 |
| -12 | -6 | -6 | 6 | | |
| -34,5 | -7,5 | -27 | ~67 | a1max | a2min |

FIG. 5

MONOLITHICALLY INTEGRABLE MIXER NETWORK FOR A MIXER CONSOLE

FIELD OF THE INVENTION

The present invention relates to audio signal processing and more particularly to control of different sound-signal sources in an audio signal processing circuit.

BACKGROUND OF THE INVENTION

The present invention relates to a monolithically integrable mixer network for a mixer console which is provided as a subcircuit for the control of different sound signal sources in an audio signal processing circuit, such as a sound processing board for a personal computer (PC) sound card, or in a car radio receiver, and in which a gradual changeover is to be effected from one signal source to another. One application of this is cross-fading from music to a current traffic information message, with the two signals coming from different sources. During the traffic information message, the channel with the music signal is attenuated and the traffic information message is faded in instead. As is well known, abrupt switching of signal sources produces annoying clicks and may also cause abrupt volume changes. A further increasingly important application of such mixer networks is imperceptible cross-fading from a noisy or fading receive channel to a better one. This mode of operation is also referred to as "diversity reception". Such cross-fading requires an all-electronic mixer network with an intelligent controller, which can be implemented, for example, with a processor connected to the mixer network proper via control lines or a bus system.

The amount of circuitry required for mixer networks can be very large, particularly if mixer networks are to be used in professional studio equipment. for example, U.S. Pat. No. 4,357,492, entitled Automatic Microphone Mixing Apparatus, issued Nov. 2, 1982 to Campbell et al.; U.S. Pat. No. 4,885,792, entitled Audio Mixer Architecture using Virtual gain Control and switching, issued Dec. 5, 1989, to Christensen et al.; U.S. Pat. No. 5,309,517, entitled Audio Multiplexer, issued May 3, 1994, to Barclay; and, U.S. Pat. No. 5,376,896, entitled Apparatus And Method For Reducing VCA Distortion And Noise, issued to Graefe et al., are examples of very large, complicated mixer networks. For consumer applications such as car radio receivers or personal computer systems, requirements are less stringent, but the amount of circuitry required for an intelligent mixer is still so large that a compact, monolithically integrable solution is needed wherein the amount of circuitry, which eventually determines the amount of chip area required, is kept to a minimum for reasons of cost.

A mixer network with active components contains at the input end a variable gain preamplifier for each channel and at the output end a summing device for combining the differently amplified signals into a single signal. The preamplifiers are advantageously implemented with circuits incorporating operational amplifiers because then the respective gain is easily adjustable by changing the ratio of the resistance of an input resistor and a feedback resistor. In an analog circuit, this is done via a slider control or a potentiometer. In a digital circuit, use is made of a resistor network which, by suitable control of taps or by electronic switching, connection or disconnection of resistors, which may also include a parallel or series connection, makes it possible to change the resistance ratio digitally, in a simple manner. The differently amplified signals of the individual channels are then combined by means of the summing device. If an operational amplifier arrangement is to be used for the summing device, a conventional summing amplifier circuit can be employed, which has one input resistor per channel and a feedback resistor common to all channels. Here too, the ratio between feedback resistance and input resistance determines the respective channel gain. Advantages of this combination are, among other things, the defined channel gain and the low impedance signal output.

The above described arrangement comprising a preamplifier and a summing amplifier has the disadvantage that, while the amplitude of the useful signal is reduced in the preamplifier by the desired value, the gain of the summing amplifier causes the constantly present internal or external noise to be passed unchanged or even raised, so that the signal to noise ratio at the output is unnecessarily degraded.

Accordingly, it is an object of the present invention to provide a circuit arrangement for a monolithically integrable mixer network wherein the internal noise or external noise dependent signal to noise ratio remains as high as possible over the entire gain or attenuation range.

SUMMARY OF THE INVENTION

The present monolithically integrable mixer network includes preamplification provided by a variable gain preamplifier for each sound channel. Outputs from the preamplification are summed at a summing amplifier whose summing gain is adjustable differently for each sound channel. Coupled to both the preamplification stage and summing gain is a control unit for controlling the overall gain for each respective sound channel, also referred to as the channel gain. the overall gain is divided between the preamplification and the summing amplifier according to a predetermined ratio which is dependent on the desired channel gain and which varies in the attenuation with increasing signal attenuation such that the summing gain is reduced more than the preamplification. An intelligent gain adjustment is implemented with electronic means.

BRIEF DESCRIPTION OF THE DRAWINGS

The invention will be better understood with reference to the following illustrative and non-limiting drawings, in which:

FIG. 5 shows in tabular form and by way of example how the respective channel gain or attenuation is divided between the preamplifier and the summing amplifier.

DETAILED DESCRIPTION OF THE INVENTION

Figure 1:
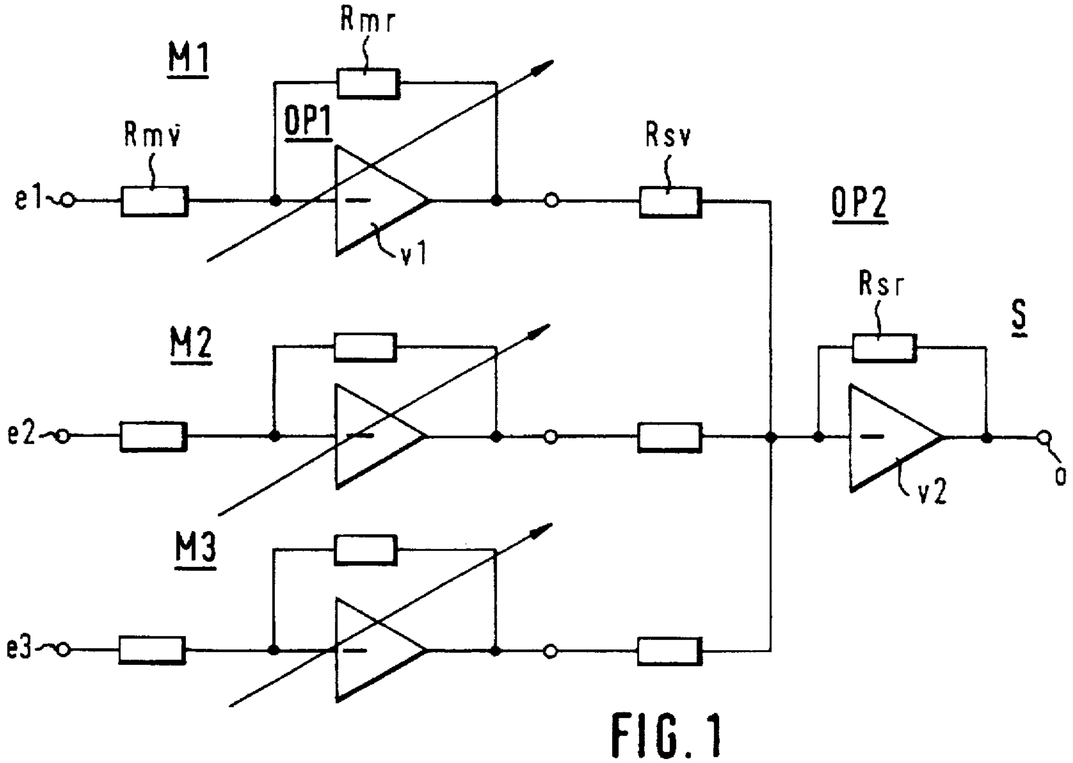
FIG. 1 shows schematically a prior art mixer network with active components.

Referring now to FIG. 1 there is shown a prior art mixer network with active circuit elements for three channels which are connected to first, second and third signal inputs e1, e2 and e3, respectively. The active circuit elements are first operational amplifiers v1 having external elements connected thereto to form first operational-amplifier arrangements OP1. The latter form first, second and third preamplifiers M1, M2, M3 for the applied signals. The outputs of the preamplifiers are connected together by means of a second operational amplifier arrangement OP2 to combine the signals of all three channels into a single signal, which is delivered at the output o. The second operational amplifier arrangement OP2 forms a summing amplifier S, which contains an operational amplifier, the second operational amplifier v2, as an active element. In both operational amplifier arrangements OP1, OP2, the active elements can also be transconductance amplifiers or other circuits with suitable external elements. In FIG. 1 the operational amplifier v2 is connected as a summing amplifier and has one input resistor Rsv per channel and a feedback resistor Rsr common to all channels.

The gains of the three preamplifiers M1, M2, M3 are adjusted via respective input resistors Rmv and feedback resistors Rmr. The input resistor Rmv is connected between the respective channel input e1, e2, e3 and the inverting input of the first operational amplifier v1. This is also the input to which the output of the operational amplifier V1 is fed back through the feedback resistor Rmr.

There are other prior art circuits for gain adjustment, but the first and second operational amplifier arrangements, OP1 and OP2 shown in FIG. 1 are advantageous in that the respective gains are determined directly by the ratio of the value of the feedback resistor Rmr, Rsr to that of the input resistor Rmv, Rsv. Gain adjustment is made possible in the first operational amplifier arrangement OP1 as the input resistor and the feedback resistor are implemented with a potentiometer or a slider control rs (see FIG. 3) whose tap a1 is connected to the inverting input of the first operational amplifier v1 and whose two other nodes k1, k2 are connected to the input e1 and the operational amplifier output, respectively. By changing the potentiometer or slider control setting, the signal in the respective sound channel can be amplified or attenuated over a very wide range.

Figure 2:
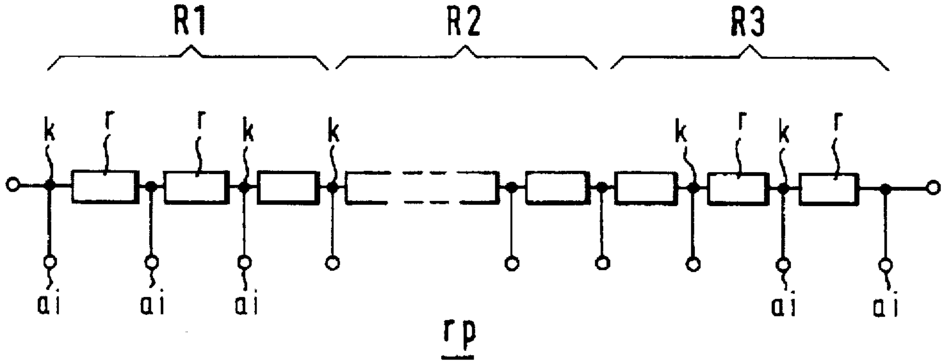
FIG. 2 shows an example of a resistor network with resistors connected in series and with a plurality of taps.

Analog adjustments of a potentiometer or slider control rs are generally made by hand or via a servomotor. Electronic adjustments are easier if only discrete gain values have to be adjusted, whose step size can be small, however. For consumer applications, a step size of, for example, 1.5 decibels is sufficient. To this end, the input resistor Rmv and the feedback resistor Rmr of the preamplifier M are implemented as a resistor network rp, as shown in FIG. 2, consisting of a plurality of resistors r which can be changed over or switched into or out of circuit via electronic switches. A series or parallel combination of resistors r is also possible.

A particularly simple arrangement for such a resistor network rp is a resistor chain consisting of mostly different resistors r, with part or all of the nodes k of the resistors provided with taps ai. Through a switching device s, as shown schematically in FIG. 3, which corresponds to a sliding contact in a slider control rs, one of the taps ai can be connected to the inverting input of the first operational amplifier v1 at a time. Via the respective tap a1, a single sliding contact divides the tapped resistor network rp into two parts, forming a first resistor R1 and a second resistor R2 coupled thereto.

Figure 4:
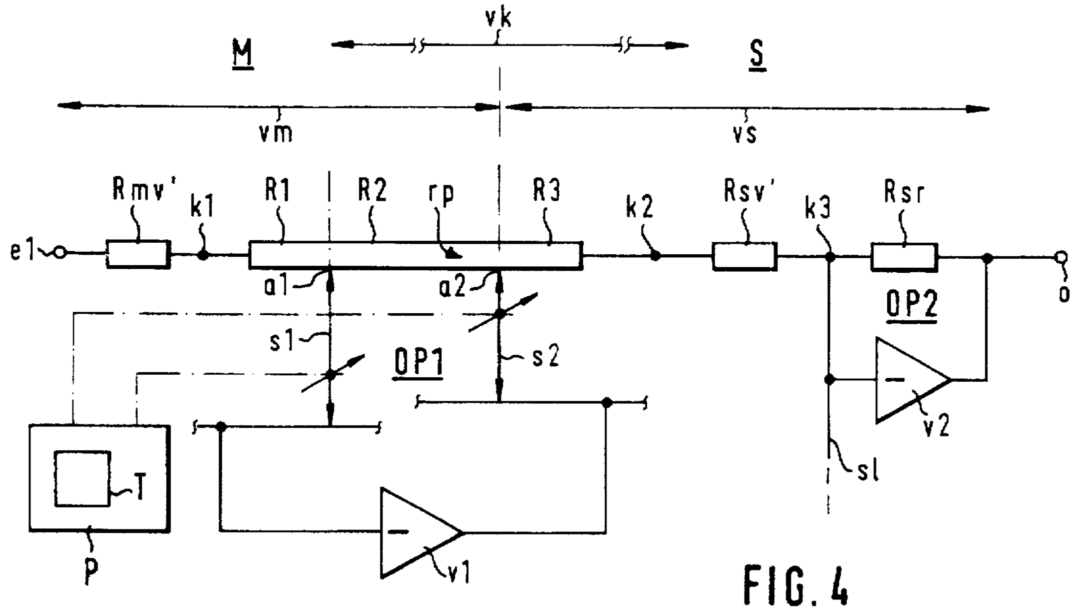
FIG. 4 is a circuit diagram of the mixer network according to the present invention.

The invention requires for this resistor chain only a second sliding or switching contact s2, as shown in FIG. 4, with which the total resistance value of the resistor chain is divided among three resistors R1, R2, R3 in a particularly simple manner. In addition, the implementation of the adjustable resistor network rp as a resistor chain makes the network especially suitable for monolithic integration. This resistor chain thus allows the resistance ratio of the two resistors R1, R2 or the three resistors R1, R2, R3 to be changed over to a wide range in a very simple manner. For a very small step size, this is achieved with a large number of resistors r, which thus form a relatively long chain. The number of resistors r can be reduced if the structure of the resistor network rp can be changed by the switching device, but this requires a complex switching device. A combination of the two methods is also possible, of course. As all three resistors R1, R2, R3 of the resistor chain are coupled together, a change in the value of a resistor will directly affect the value of the adjacent resistor, i.e., the resistor connected to the same tap ai. Through a parallel shift of the two taps a1, a2, the resistance change can also be performed so that only the values of the two outer resisters R1, R3 will change while the value of the middle resistor R2 will remain constant. In the embodiment of FIG. 4, the mutual coupling of the three resistor R1, R2, R3 is skillfully utilized to effect a sliding gain distribution.

Figure 3:
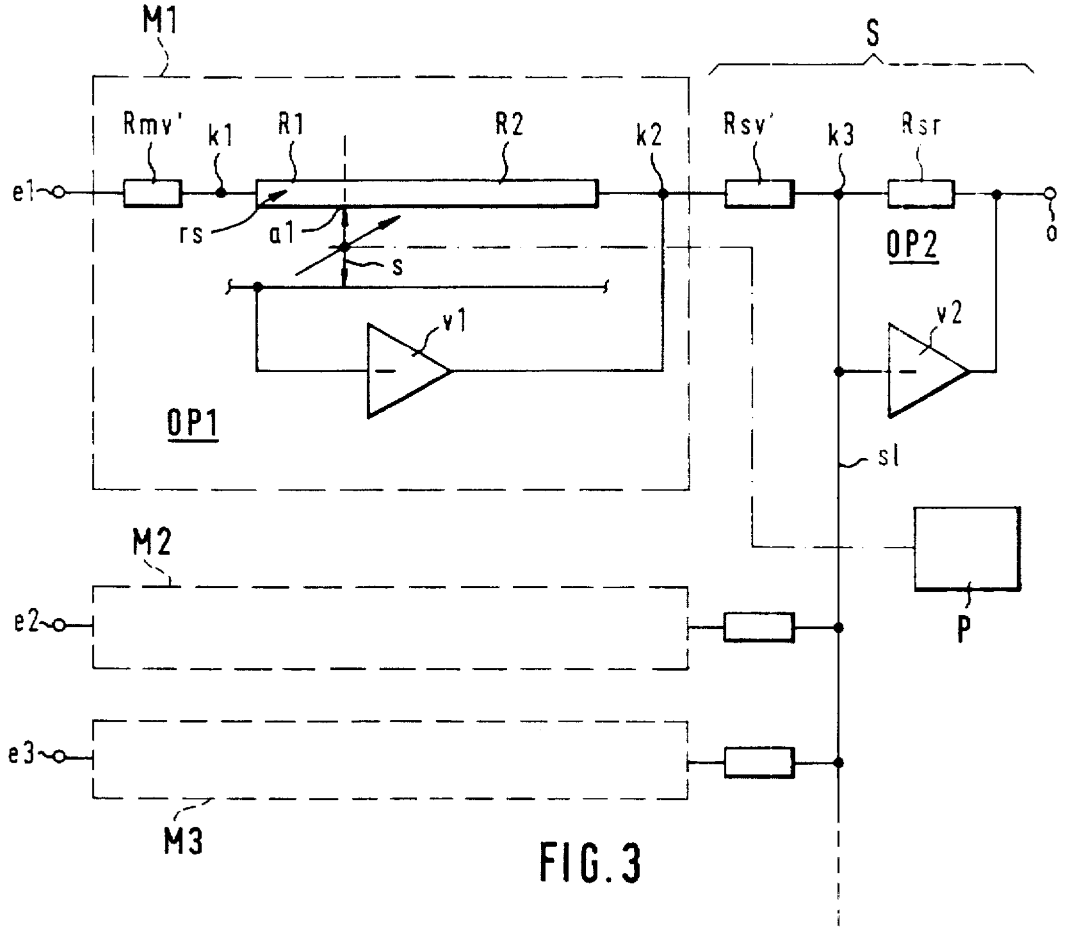
FIG. 3 is a more detailed circuit diagram of the mixer network of FIG. 1.

The circuit arrangement of FIG. 1, particularly the first operational amplifier arrangement OP1, is shown in greater detail in FIG. 3. The gain control portion in the preamplifier M contains a variable resistor in the form of a slider control rs, whose tap a1 is connected via a sliding contact s to the inverting input of the first operational amplifier v1. The input of the slider control rs, the first node k1, is connected to the signal input e1 through a fixed resistor Rmv'. Through the tap a1 the resistance of the slider control rs is divided into two parts, forming a fist resistor R1 and a second resistor R2. The output of the slider control, which is formed by a second node k2, is connected to the output of the first operational amplifier v1 and then to the one terminal of a fixed resistor Rsv', which serves as the input resistor Rsv of the summing amplifier S for this channel. In the first operational amplifier arrangement OP1, the sum of the values of the fixed resistor Rmv', and the second resistor R2 forms the feedback resistor Rmr, as shown in FIG. 1. The junction of the fixed resistors Rsv' and Rsr forms a third node k3, which is connected to the inverting input of the second operational amplifier v2 by a summing line s1. To this summing line s1, a second preamplifier M2 and a third preamplifier M3 are connected through associated further input resistors. The sliding contact s, of the slider control rs, can be operated by hand or electronically by a control unit P. In a digital design of the slider control rs or potentiometer, the electronic control becomes simpler as only electronic switching devices have to be operated. The slider control rs or the potentiometer is then replaced by a resistor network rp with taps.

FIG. 4, clearly shows the differences of the invention from the prior art illustrated in FIG. 3. Like parts are designated by like reference characters and need not be explained again. The slider control rs in the preamplifier M has been replaced by a resistor network rp. First and second electronic switches s1 and s2 establish connections to the first and second taps a1 and a2, respectively, so that the resistor network is divided into three portions, which form the first, second, and third resistors R1, R2, and R3, respectively. The permissible portions for the first and second taps a1, a2 do not overlap. In FIG. 4 the associated portions are shown schematically by the length of the respective sliding contact lines.

In the first operational amplifier arrangement OP1, like in FIG. 3, the fixed resistor Rmv' and the first resistor R1 combine to form the input resistor Rmv, as shown in FIG. 1, and the second resistor R2 forms the feedback resistor Rmr. In the second operational amplifier arrangement OP2, the third resistor R3 combines with the fixed resistor Rsv' to form the input resistor Rsv, as shown in FIG. 1. Since the feedback resistor Rsr of the second operational amplifier arrangement OP2 is a fixed resistor, the gain or attenuation of this arrangement is controlled by varying the value of the third resistor R3. Since the second tap a2 is connected to the output of the first operational amplifier v1 via the second switch s2, the gain vm of the preamplifier M can be controlled via the positions of the first switch s1 and the second switch s2 together or via either of these positions separately. The gain vm of the preamplifier M is determined by the ratio of the value of the second resistor R2 to the sum of the values of the fixed resistor Rmv' and the first resistor R1. It should be noted that the resistors Rmv', Rsv', and Rsr can also be incorporated into the resistor network, of course.

The electronic switches s1, s2 and any further switches that may be present are controlled by the control unit P, which assigns the respective positions of the switches s1, s2 to the desired channel gain vk by means of a stored table T. The overall channel gain vk is the channel related gain product vk=vm×vs of the preamplifier M and the summing amplifier S.

The dynamic range of +12 decibels (dB) to −34.5 dB has been divided into two ranges 1 and 2, as shown in FIG. 5, with the first range 1 extending from +12 dB to approximately −6 dB and the second range from approximately −6 dB to −34.5 dB.

In the first range 1, which thus covers the entire channel gain range of 0 dB to +12 dB and the low attenuation range up to −6 dB, the summing gain vs remains constant at 0 dB. The channel gain vk is thus adjusted only by changing the resistance ratio in the amplifier M, which is done by varying the position of the first tap a1. If the two fixed resistors Rsv' and Rsr of the second operational arrangement OP2 are equal in value, in the example of FIG. 4: 3 kilo-ohms, the second tap a2 will be identical with the second node k2 for this gain range. The input resistor Rsv (Rsv=Rsv'+R3) of the summing amplifier S then has its minimum value, namely only the value of the fixed resistor Rsv'. At the maximum gain, +12 dB, the first tap a1 corresponds to the first node k1. The feedback resistor Rmr of the preamplifier M, which is formed by the second resistor R2, thus assumes its maximum value, namely the value of the entire resistor network rp, with R1=R3=0. With decreasing gain, the tap a1 moves in the direction of the second node k2 until finally, at a channel gain of −6 dB, a maximum value for the first resistor R1, and thus for the complete input resistor Rmv with Rmv=Rmv'+R1, is reached, this maximum value corresponding to a tap a1max.

According to the present invention, in the attenuation range, particularly in the presence of high attenuation, which corresponds to the lower portion of the second range 2 in FIG. 5, the channel gain vk is so divided that, as far as possible, attenuation is introduced in the summing amplifier S, not in the preamplifier M. This is achieved by stopping to change the value of the first resistor R1 after its maximum value has been reached. Thus, because of the only relatively small reduction of the value of the second resistor R2 in the second range 2, the preamplification vm varies only between −6 dB and −7.5 dB, while the overall channel gain vk varies between −6 dB and −34.5 dB. To this end, the second tap a2 is moved, starting from the second node k2 in the direction of the first node k1, until the third resistor R3, and thus the input resistor Rsv which equals Rsv'+R3, reaches its maximum value, which corresponds to a tap a2 min (the count direction begins at k1). As a result, the value of the input resistor Rsv increases from 6 kilo-ohms to approximately 67 kilo-ohms. This corresponds to a change in the summing gain from −0 dB to −27 dB.

If in certain gain and attenuation ranges, e.g., in the first and second ranges 1, 2 in FIG. 5, it is possible to proceed uniformly, e.g., if only a single tap ai is to be changed, the table T to be stored in the control unit P will become simpler. Its extent is further dependent on the smallest step size of the gain change, for which 1.5 dB is sufficient in the above example. The function of the control unit P can also be performed by an on-chip processor.

Of course, the control of the gain division, and thus the control of the taps, can also be defined via a more or less descriptive formula, which is then computed in the processor. For the formulaic representation of the gain division, in which the function may even be defined differently from section to section, the channel gain vk forms the variable. The formulaic representation is particularly simple if a linear dependence is specified for the individual ranges or sections as an approximation, because the intermediate values can then be easily computed by linear interpolation.

It should be understood that the embodiment described herein is merely exemplary and that a person skilled in the art may make many variations and modifications to this embodiment utilizing functionally equivalent elements to those described herein. Any and all such variations or modifications as well as others which may become apparent to those skilled in the art, are intended to be included within the scope of the invention as defined by the appended claims.

What is claimed is:

1. A monolithic integrable mixer network for a mixer console controlling different channels, comprising:

a variable gain preamplifier for each channel;

a summing amplifier, coupled to the output of each variable gain amplifier, having a summing gain adjustable differently for each sound channel; and, an electronic control unit, coupled to each variable gain preamplifier and the summing amplifier, serving to automatically control an overall gain for each sound channel gain being divided between its variable gain preamplifier and the summing amplifier according to a predetermined ratio dependent on the desired channel gain, the ratio varying in the attenuation range with increasing channel attenuation such that the summing gain is reduced more than the preamplification by the variable gain preamplifier.

2. The mixer network according to claim 1, wherein the preamplification and the associated summing gain are digitally adjustable from the variable gain preamplifier and the summing amplifier forming a first operational amplifier arrangement and a second operational amplifier arrangement providing a channel gain being digitally adjustable via a plurality of serially coupled resistive elements defining a tapped resistor network and an electronic switching device.

3. The mixer network according to claim 2, wherein the variable gain preamplifier and the tapped resistor network are connected via the electronic switching device, coupled to the control unit, to a first operational amplifier to form the first operational amplifier arrangement such that a first portion of the tapped resistor network forming a first resistor, is associated with an input resistor, while a second portion of the tapped resistor network forming a second resistor, is associated with a feedback resistor.

4. The mixer network according to claim 3, wherein the second operational amplifier arrangement comprises a second operational amplifier, an input resistor coupled to the input of said second operational amplifier, and a feedback resistor coupled to the output of said second operational amplifier, said input resistor including a first fixed resistor and said feedback resistor including a second fixed resistor.

5. The mixer network according to claim 4, further including a third portion of the tapped resistor network being a third resistor serially coupled to said first fixed resistor of said second operational amplifier arrangement to form said input resistor.

6. The mixer network according to claim 5, wherein the tapped resistor network comprises a series combination of resistors and that some nodes of the resistors are designed as taps forming the first, second and third resistors by means of a first electronic switch associated with a first tap and by means of a second electronic switch associated with a second tap.

7. The mixer network according to claim 6, wherein for a first channel gain range corresponding to a large signal amplification, the input resistor of the second operational amplifier arrangement is set at a minimum value and the respective value of the channel gain is defined via the position of the first tap.

8. The mixer network according to claim 7, wherein for the first channel gain range the first tap and second tap are at positions that minimize the influence by the first resistor and second resistor.

9. The mixer network according to claim 7, wherein for the control unit the channel gain is divided between the variable gain preamplifier and the summing gain by at least one of means of a stored table and means of a computed formula.

10. The mixer network according to claim 6, wherein for a second channel gain range corresponding to a high signal attenuation, the first resistor is set at a maximum value and the respective value of the channel gain is defined via the position of the second tap.

11. The mixer network according to claim 10, wherein for the second channel gain range the first tap and second tap are at positions such that the first resistor and second resistor are influential.

12. The mixer network according to claim 10, wherein for the control unit the channel gain is divided between the variable gain preamplifier and the summing gain by at least one of means of a stored table and means of a computed formula.

13. The mixer network according to claim 6, wherein the first tap is adjustable from a first position, corresponding to a minimum value for the first resistor, to a second position, corresponding to a maximum value for the first resistor, the first resistor having intermediate values proportional to intermediate positions of the first tap.

14. The mixer network according to claim 6, wherein the second tap is adjustable from a first position, corresponding to a minimum value for the third resistor, to a second position, corresponding to a maximum value for the third resistor, the third resistor having intermediate values proportional to intermediate positions of the second tap.

15. The mixer network according to claim 6, wherein for an intermediate channel gain range corresponding to at least one of a small signal amplification and a low signal attenuation, the input resistor of the second operational arrangement is set at a minimum value and the respective value of the channel gain is defined via the position of the first tap.

16. The mixer network according to claim 6, wherein for the control unit the channel gain is divided between the variable gain preamplifier and the summing gain by at least one of means of a stored table and means of a computed formula.

17. The mixer network according to claim 2, wherein for the control unit the channel gain is divided between the variable gain preamplifier and the summing gain by at least one of means of a stored table and means of a computed formula.

18. The mixer network according to claim 3, wherein for the control unit the channel gain is divided between the variable gain preamplifier and the summing gain by at least one of means of a stored table and means of a computed formula.

19. The mixer network according to claim 4, wherein for the control unit the channel gain is divided between the variable gain preamplifier and the summing gain by at least one of means of a stored table and means of a computed formula.

20. The mixer network according to claim 5, wherein for the control unit the channel gain is divided between the variable gain preamplifier and the summing gain by at least one of means of a stored table and means of a computed formula.

* * * * *